United States Patent [19]

Biondetti

[11] 4,334,344

[45] Jun. 15, 1982

[54] CONTROLLED DEFLECTION ROLL

[75] Inventor: Mario Biondetti, Schio, Italy

[73] Assignee: Escher Wyss Ltd., Zurich, Switzerland

[21] Appl. No.: 185,530

[22] Filed: Sep. 9, 1980

[30] Foreign Application Priority Data

Sep. 19, 1979 [CH] Switzerland .................. 8451/79

[51] Int. Cl.³ ............................................. B21B 13/02
[52] U.S. Cl. ............................................. 29/116 AD
[58] Field of Search ...... 29/116 AD, 113 AD, 116 R, 29/115, 113 R

[56] References Cited

U.S. PATENT DOCUMENTS 4,000,979  1/1977  Biondetti ........................... 29/115
4,136,546  1/1979  Lehmann ..................... 29/116 AD X
4,293,988  10/1981 Biondetti ..................... 29/116 AD Primary Examiner—Peter P. Nerbun
Attorney, Agent, or Firm—Werner W. Kleeman

[57] ABSTRACT

A controlled deflection roll containing a stationary roll support and a roll shell rotatable about the roll support. The roll shell is provided with a substantially ring-shaped closure element having an opening which surrounds the roll support in spaced relationship and enables movements of the roll shell in all radial directions in relation to the roll support. The closure element is connected by a torque coupling with the roll support and is provided with a drive gear meshing with a toothed rim provided at the roll shell. Gears can be arranged at both ends of the roll shell and interconnected by a connection shaft.

7 Claims, 5 Drawing Figures

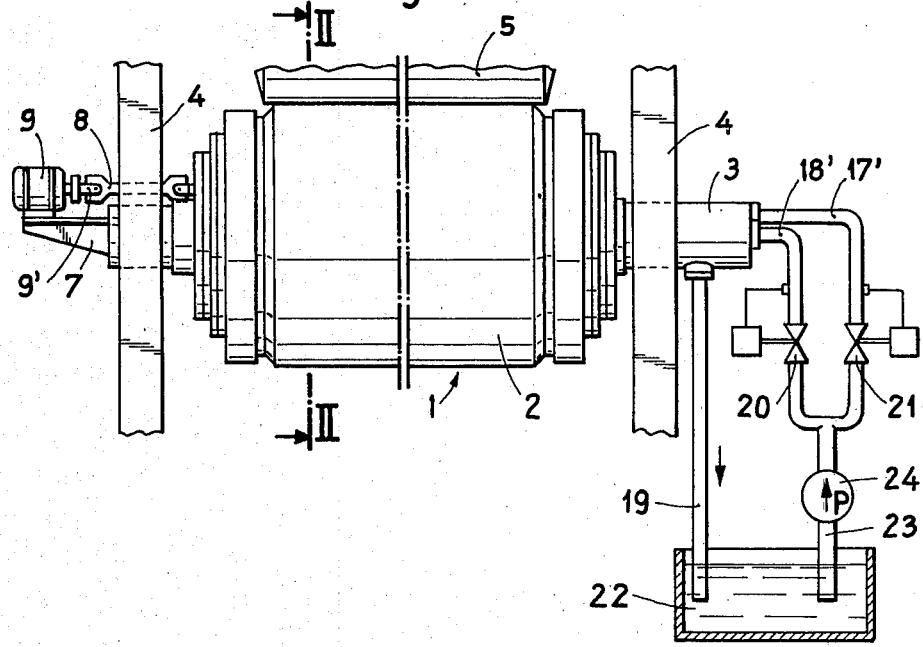
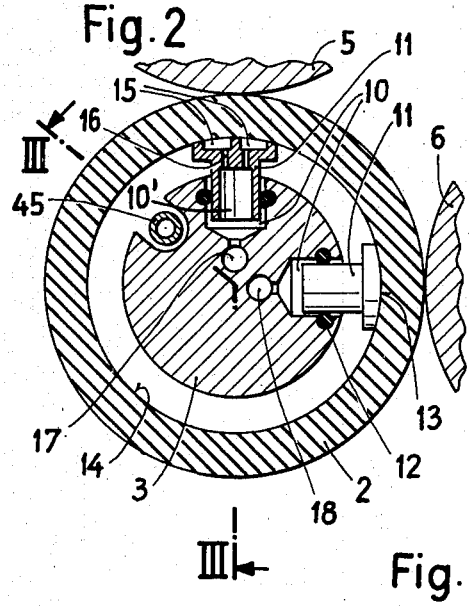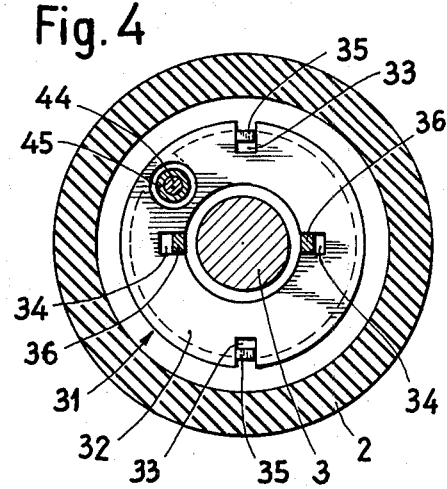
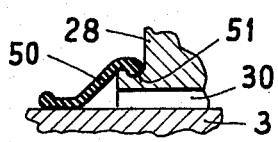

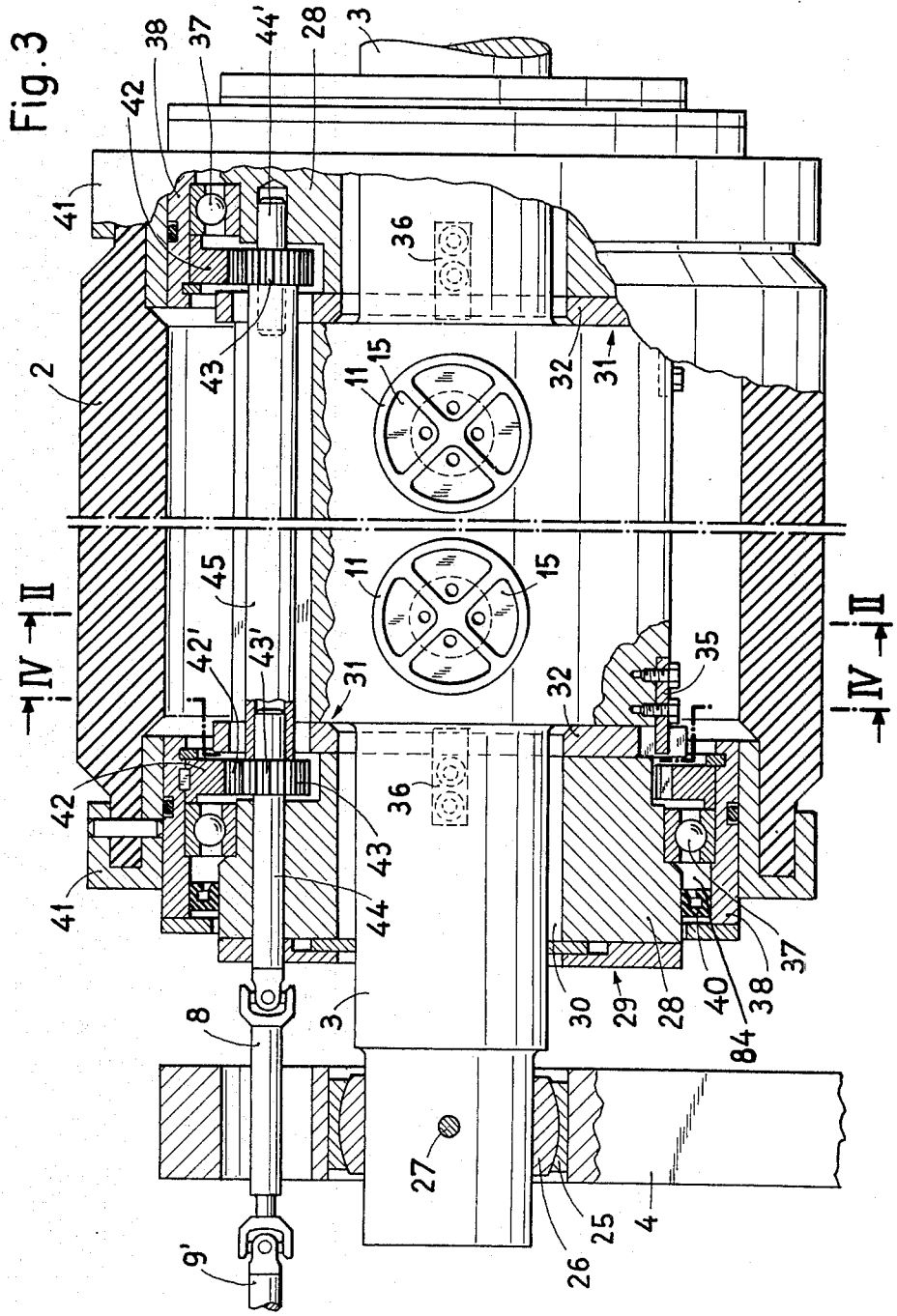

CONTROLLED DEFLECTION ROLL

BACKGROUND OF THE INVENTION

The present invention relates to a new and improved construction of a controlled deflection roll, also sometimes referred to in the art as a roll with bending or sag compensation.

Generally speaking, the controlled deflection roll of the present development is of the type comprising a stationary roll support and a roll shell mounted to be rotatable about the roll support. The roll shell is supported independently of the sag or bending-through of the roll support upon the roll support with the aid of at least one support arrangement. At the end regions of the roll shell there is arranged a respective ring-shaped closure element which is rotatably mounted in the roll shell. Each closure element has an opening which surrounds the end of the roll support in spaced relationship in such a manner that the roll shell together with sealing ring means is movable in a number of radial directions in relation to the roll support.

A controlled deflection roll or pressure roll of this type is known to the art from U.S. Pat. No. 4,136,546, granted Jan. 30, 1979. In FIG. 1 of such patent the closure element is mounted in the roll shell with the aid of a ball bearing and is prevented from rotating relative to the roll support by means of a rubber sleeve. The particular advantage of this prior art construction resides in the fact that it can be provided with a number of support element arrangements which are effective in different pressure or pressing planes, without there being formed statically undefined forces in a bearing of the roll shell, as for instance is the case with the controlled deflection rolls disclosed in U.S. Pat. No. 3,430,319, granted Mar. 4, 1969 and U.S. Pat. No. 3,802,044, granted Apr. 9, 1974, reference being particularly made to FIG. 9 thereof.

SUMMARY OF THE INVENTION

Therefore, with the foregoing in mind it is a primary object of the present invention to provide a new and improved construction of controlled deflection roll which is not afflicted with the aforementioned drawbacks and limitations of the prior art constructions discussed above.

Another and more specific object of the present invention aims at providing a new and improved construction of controlled deflection roll constituting an improvement upon the prior art controlled deflection rolls, with the aim of rendering possible a motor drive of the roll shell notwithstanding mobility of the roll shell in relation to the roll support in different radial directions.

Now in order to implement these and still further objects of the invention, which will become more readily apparent as the description proceeds, the controlled deflection roll of the present development is manifested by the features that the roll shell is provided with a toothed rim having internal teeth with which meshes the gear teeth of a pinion or the like. The pinion is attached to a drive shaft which piercingly extends through the closure element and is mounted thereat. The closure element is connected with the roll support by means of a torque coupling suitable for transmitting a torque or rotational moment. The torque coupling prevents rotation of the closure element relative to the roll support, but allows parallel displacement of the closure element in relation to the roll support.

By virtue of these measures there is realized a simple and reliable drive arrangement for the controlled deflection roll, and there is advantageously employed the closure element which previously only served for attachment of the seals. The reaction moment which results upon driving the roll shell is supported at the torque coupling which is designed such that it can take-up this torque or moment in contrast to sealing sleeves or collars which, with the pressure roll disclosed in the aforementioned U.S. Pat. No. 4,136,546, the right-hand portion of FIG. 1, prevented rotation of the closure element.

The torque coupling preferably can comprise a ring member having four guide slots arranged along two mutually perpendicular radial lines. Each two diametrically opposite guide slots are connected by guide elements guided therein with the roll support and with the closure element. Such type of known torque coupling is robust and simple and is particularly suitable for use in fulfilling the purposes of the invention.

When working with particularly long controlled deflection rolls it is possible to provide the roll shell at both of its ends with toothed rims. Both pinions meshing with the toothed rims at the ends of the roll shell can be interconnected with one another by a connection shaft or equivalent structure. Due to this arrangement the torque can be introduced into the roll shell at both of its ends, so that with given dimensions it is possible to transmit greater power and to avoid possible deformation of the roll shell by torsion.

The drive shaft mounted in the closure element can be connected by means of a universal shaft or equivalent structure with a drive device, such as for instance a gearing motor. However, it is also possible and within the framework or the invention to employ other drive systems as the drive arrangement.

Preferably, the roll shell can be supported upon hydrostatic support or pressure elements located between the roll support and the roll shell. These support elements are provided with hydraulic pressure chambers or spaces to which there can be infed a pressurized fluid medium serving for the formation of the requisite contact or pressing force. Such type support or pressure elements are provided in the controlled deflection rolls of the previously mentioned U.S. Pat. Nos. 3,430,319, 3,802,044 and 4,136,546. However, it should be specifically understood that different suitable constructions of support elements from those disclosed therein are equally possible for use in the controlled deflection roll of the present development.

The advantage of the inventive controlled deflection roll is particularly then apparent if there are provided at least two support element arrangements which are effective in different pressure planes, for instance in the form of elongate support ledges or rows of support pistons. The mobility of the roll shell in different pressure planes is not hindered, and the drive of the roll shell is equally effective in all positions.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic front view of a controlled deflection roll constructed according to the invention;

FIG. 2 is a cross-sectional view of the arrangement of FIG. 1, taken substantially along the line II—II thereof;

FIG. 3 is a fragmentary sectional view, on an enlarged scale, of the controlled deflection roll shown in FIG. 2, taken substantially along the line III—III thereof;

FIG. 4 is a sectional view of the controlled deflection roll shown in FIG. 3, taken substantially along the line IV—IV thereof, and revealing details of the torque coupling; and FIG. 5 is a fragmentary sectional view of a detail of the arrangement of FIG. 3 showing a different embodiment of seal between the closure ring or element and the roll support of the controlled deflection roll.

DETAILED DESCRIPTION OF THE PREFERRED EMBODIMENTS

Describing now the drawings, it is to be understood that only enough of the construction of the controlled deflection roll of the present development has been shown in the drawings to enable those skilled in the art to readily understand the underlying principles and concepts of this invention. Turning attention specifically to FIG. 1, there is shown therein an exemplary embodiment of controlled deflection roll 1 containing a roll shell 2 which is mounted in conventional fashion to be rotatable about a roll support or supporting member 3. The roll support 3 is fixedly supported in a stand or frame arrangement 4 which only has been partially illustrated in the drawings to simplify the same, particularly since details of the frame arrangement are unimportant as concerns the teachings of the invention. This controlled deflection roll 1 coacts with a counter-roll 5 as well as with a further counter-roll 6, each of which have been partially illustrated in FIG. 2. In order to drive the roll shell 2 there is provided a gearing motor 9 or equivalent drive which is secured to a bracket 7 fixed to the stand or frame arrangement 4. The drive motor 9 drives a drive shaft 44 (FIG. 3) located within the roll shell 2 by means of a Cardan shaft 8.

As best seen by referring to FIG. 2, bores 10 are provided in the roll support 3. These bores or recesses 10 are structured so that they can receive therein displaceable pistonlike hydraulic support or pressure elements 11. These support elements 11 are movably sealingly guided in sealing rings 12 within the bores 10. These support or pressure elements 11 are provided with bearing surfaces 13 for supporting the inner surface 14 of the roll shell 2. The bearing surfaces 13 are provided with bearing pockets 15. Each bearing pocket 15 is individually connected by a throttle bore 16 with its related pressure chamber 10' formed by the corresponding bore 10.

As also will be seen by referring to FIG. 2, the two rows of bores 10, of which each forms together with the support elements 11 a respective support element arrangement, are connected by means of bores or channels 17 and 18 provided in the roll support 3 with a suitable supply device for the supply of a suitable pressurized fluid medium, typically for instance pressurized oil. In the bores 17 and 18 it is possible for there to prevail different pressures by means of which the roll shell 2 can be pressed against the counter-rolls 5 and 6, respectively.

As will be apparent from the showing of FIG. 1, pipe lines or conduits 17' and 18' flow communicate with the bores 17 and 18. These pipe conduits 17' and 18' are provided with conventional pressure regulating valves 20 and 21, respectively. The pressurized fluid medium is fed to the pressure regulating valves 20 and 21 from a supply container or reservoir 22 by means of a line 23 with the aid of a feed pump 24. The hydraulic medium is returned in conventional manner from the intermediate space between the roll support 3 and the roll shell 2 by a return flow line or conduit 19 back into the supply container or reservoir 22.

FIG. 3 illustrates a sectional view of the arrangement of FIG. 2 on an enlarged scale and taken essentially along the section line III—III of FIG. 2. As will be recognized from the illustration of FIG. 3 the ends of the roll support 3 are mounted at the stand or frame arrangement 4 in spherical bearing shells 25 and 26 or equivalent structure. The roll support 3 is prevented at one end thereof from carrying out a rotation in relation to the frame arrangement 4 by means of a pin 27 or the like.

As will be further seen by reverting to FIG. 3, at both ends of the controlled deflection roll 1 there are arranged substantially ring-shaped closure elements 28 which surround the roll support 3 by means of a substantially ring-shaped intermediate space 30. Such intermediate space 30 is closed towards the outside by a suitable seal arrangement 29. Both of the closure elements 28 are each provided with a torque coupling 31, such as a cross coupling, which interconnects these closure elements 28 with the roll support 3 and prevents rotation of the closure elements 28 in relation to the roll shell 2. As particularly evident from the illustration of FIG. 4, this torque or cross coupling 31 or equivalent structure contains a circular coupling disk 32 in which there are formed radial slots 33 and 34 extending perpendicular to one another. In the guide slots 33 there are guided the holder elements 35 of the roll support 3, while in the guide slots 34 there are guided the holder elements or holder means 36 of the related closure element 28. At this point it is remarked that since opposite ends of the controlled deflection roll may be similarly constructed as concerns the closure elements and coacting components it will suffice for purposes of this disclosure to consider in detail only one end of the controlled deflection roll.

Continuing, upon the closure element 28 there is mounted by means of a ball bearing 37 an outer ring 38, and the intermediate space 84 between the outer ring 38 and the closure element or closure means 28 is closed by a sealing ring 40 or equivalent structure. At the outer ring 38 there is attached in any suitable and therefore not particularly illustrated manner, for instance by fixedly clamping or affixing by suitable fastening elements, an end ring 41 of the roll shell 2. In this case the roll shell 2 can be fabricated of an elastomeric or elastic material or a suitable plastics material.

Now according to the invention there is secured within the outer ring 38 of the roll shell 2 a toothed rim or toothed element 42 containing the internal teeth 42'. The teeth 43' of a pinion 43 mesh with the internal teeth 42' of the toothed rim 42. The pinion shaft 44 of the pinion 43 is rotatably mounted at the related closure element 28. This pinion shaft 44 is connected with the previously described Cardan shaft 8 which drivingly connects such shaft 8 with the drive or gearing shaft 9' of the drive or gearing motor 9.

As also will be seen by inspecting FIG. 3, at the other end of the roll shell 2 there is likewise mounted an outer or external ring 38 having a toothed rim 42 containing the internal teeth 42' with which meshes the teeth 43' of a further pinion 43. This pinion 43 is provided in this case with a short pinion shaft 44' which does not extend towards the outside. According to the embodiment under discussion the pinion shaft 44' is connected by a substantially tubular-shaped connection shaft 45 with the pinion shaft 44 of the other pinion 43.

During operation, the intermediate space 30 between the roll support 3 and the related closure element 28 allows for a limited radial mobility of the roll shell 2 in relation to the roll support 3, so that both of the support arrangements formed by the piston-like pressure or support elements 11 can freely press the roll shell 2 against the counter-rolls 5 and 6. Hence, the roll shell 2 can be driven in each of these positions by the gearing or drive motor 9, and with the aid of the pinion 43 and the toothed rim 42 the roll shell 2 can be rotated upon the roller bearings 37. The resultant torque or rotational moment is supported at the roll support 3 with the aid of the coupling arrangement 31.

FIG. 5 is a detail sectional showing of the arrangement of FIG. 3 and illustrates a different possibility of sealing the intermediate space 30 between the closure element 28 and the roll support 3. In this case there is provided a sealing sleeve or collar 50 which, for instance, can be attached at the roll support 3 by means of a suitable conventional and therefore not particularly illustrated clamp or equivalent structure. The sealing sleeve or collar 50 engages, as shown, in a suitably configured groove 51 provided at the related closure element 28.

While there are shown and described present preferred embodiments of the invention, it is to be distinctly understood that the invention is not limited thereto, but may be otherwise variously embodied and practiced within the scope of the following claims. Accordingly,

What I claim is:

1. A controlled deflection roll comprising:
   a stationary roll support;
   a roll shell;
   means for mounting said roll shell to be rotatable about said stationary roll support;
   at least one support arrangement for supporting the roll shell upon the roll support;
   said roll shell having opposite end regions;
   a respective substantially ring-shaped closure element provided for each end region of said roll shell;
   means for rotatably mounting each said closure element in said roll shell;
   sealing means provided for said roll shell;
   each closure element being provided with an opening surrounding the related end of the roll shell in spaced relationship such that said roll shell together with said sealing means is movable in relation to the roll support in a number of radial directions;
   a toothed rim having internal teeth provided for said roll shell;
   a pinion having pinion teeth meshing with said internal teeth of said toothed rim;
   a drive shaft with which there is connected said pinion;
   said drive shaft cooperating with a related one of said closure elements and extending through said related closure element;
   a torque coupling serving to transmit a torque for connecting the closure element with the roll support; and
   said torque coupling preventing rotation of the closure element relative to the roll support but enabling parallel displacement of such closure element in relation to the roll support.

2. The controlled deflection roll as defined in claim 1, wherein:
   said torque coupling comprises a ring member having four guide slots;
   said four guide slots being arranged in two diametrically opposite pairs;
   each diametrically opposite pair of guide slots being disposed essentially at rightangles with respect to the guide slots of the other diametrically opposite pair of guide slots; and
   guide means provided for said guide slots for connecting a first pair of the diametrically oppositely situated guide slots with the roll support and the other pair of diametrically oppositely situated guide slots with the related closure element.

3. The controlled deflection roll as defined in claim 1, wherein:
   a respective one of said toothed rims is provided at each opposed end region of said roll shell;
   a respective one of said pinions being provided at each opposed end region of said roll shell and meshing with the related tooth rim; and
   a connection shaft for interconnecting said pinions.

4. The controlled deflection roll as defined in claim 1, wherein:
   said drive shaft is mounted in the related closure element;
   drive means for driving said drive shaft; and
   a Cardan joint for connecting said drive shaft with said drive means.

5. The controlled deflection roll as defined in claim 1, wherein:
   said at least one support arrangement comprises hydrostatic support elements supported between said roll support and said roll shell; and
   said hydrostatic support elements being provided with hydraulic pressure chambers to which there is infed a pressurized fluid medium serving for the formation of a pressing force.

6. The controlled deflection roll as defined in claim 1, wherein:
   said at least one support arrangement comprises two support element arrangements effective in different pressure planes.

7. A controlled deflection roll comprising:
   a stationary roll support;
   a roll shell;
   means for mounting said roll shell to be rotatable about said stationary roll support;
   at least one support arrangement for supporting the roll shell upon the roll support;
   said roll shell having an end region;
   a substantially ring-shaped closure element provided for said end region of said roll shell;
   means for rotatably mounting said closure element in said roll shell;
   each closure element being provided with an opening surrounding the related end of the roll shell in spaced relationship such that said roll shell is movable in relation to the roll support in a number of radial directions;

a toothed element having teeth provided for said roll shell;

a gear having teeth meshing with said teeth of said toothed element;

a drive shaft with which there is connected said pinion;

said drive shaft cooperating with said closure element and extending through said closure element;

coupling means for connecting the closure element with the roll support; and said coupling means preventing rotation of the closure element relative to the roll support but enabling parallel displacement of such closure element in relation to the roll support.

* * * * *